United States Patent [19]

Tate et al.

[11] 3,860,071

[45] Jan. 14, 1975

[54] METHOD FOR STIMULATING WELL PRODUCTION

[75] Inventors: Jack F. Tate; Jim Maddox, Jr., both of Houston, Tex.

[73] Assignee: Texaco Inc., New York, N.Y.

[22] Filed: Dec. 26, 1973

[21] Appl. No.: 428,551

[52] U.S. Cl. .................................. 166/307, 166/308
[51] Int. Cl. ........................ E21b 43/26, E21b 43/27
[58] Field of Search ............ 166/307, 308, 273–275, 166/271, 281, 282; 252/8.55 C

[56] References Cited
UNITED STATES PATENTS

| | | | |
|---|---|---|---|
| 3,122,204 | 2/1964 | Oakes | 166/307 |
| 3,452,818 | 7/1969 | Gidley et al. | 166/308 |
| 3,508,612 | 4/1970 | Reisberg | 166/274 |
| 3,601,197 | 8/1971 | Ayers, Jr. et al. | 166/307 |
| 3,663,477 | 5/1972 | Ahearn | 166/308 X |
| 3,681,240 | 8/1972 | Fast et al. | 166/307 X |
| 3,712,377 | 1/1973 | Hill et al. | 166/273 X |
| 3,734,186 | 5/1973 | Williams | 166/307 |
| 3,811,504 | 5/1974 | Flournoy et al. | 166/274 X |
| 3,811,505 | 5/1974 | Flournoy et al. | 166/274 |
| 3,811,507 | 5/1974 | Flournoy et al. | 166/274 |

*Primary Examiner*—Stephen J. Novosad
*Attorney, Agent, or Firm*—T. H. Whaley; C. G. Ries

[57] ABSTRACT

The production of hydrocarbons from a subterranean hydrocarbon-bearing formation containing acid-soluble components, such as one composed at least in part of dolomite or limestone, is stimulated by injecting into the formation a composition comprising an aqueous solution of a mineral acid having dissolved therein an admixture hereinafter described. The elimination of plugging of capillary openings within the formation and mineral scale deposition on production equipment due to post-precipitation of dissolved salts subsequent to acidization by means of the said admixture results in a substantial improvement in hydrocarbon recovery.

14 Claims, No Drawings

METHOD FOR STIMULATING WELL PRODUCTION

FIELD OF THE INVENTION

This invention relates to a method for stimulating the production of fluids from earthen formations. More particularly, this invention relates to a method in which the productivity of a hydrocarbon-bearing formation containing acid-soluble components and with or without water-sensitive clays or shales is improved upon treatment of the formation with an aqueous solution of a mineral acid and an admixture as hereinafter described, said admixture effecting the elimination of plugging of capillary openings due to post-precipitation of dissolved salts subsequent to the acidization as well as effecting elimination of mineral scale on production equipment such as pumps, tubing, etc. caused by such precipitation.

DESCRIPTION OF THE PRIOR ART

The technique of increasing the permeability of a subterranean hydrocarbon-bearing formation and of removing obstructing acid-soluble mineral scale for the purpose of stimulating the production of fluids therefrom has long been practiced in the art. One such method commonly employed is known as acidizing which is widely utilized in treating subsurface acid-soluble geological formation, e.g., limestone, dolomite, etc. The technique is not limited to application in formations of high acid solubility. Sandstone and gypsum-containing formations may require acidization if the produced water is unstable with respect to $CaCO_3$. In the usual well-acidizing procedure, a non-oxidizing mineral acid is introduced into the well and under sufficient pressure is forced into the adjacent subterranean formation where it reacts with formation components, and deposited mineral scale, particularly the carbonates such as calcium carbonate, magnesium carbonate, etc., to form the respective salt of the acid, carbon dioxide and water. The usual mineral acid employed in such acidization procedures is hydrochloric acid.

During the acidizing process passageways for fluid flow are created or existing passageways therein are enlarged thus stimulating the production of oil, water, brines and various gases. If desired, the acidization may be carried out at an injection pressure sufficiently great to create fractures in the strata or formation which has the desired advantage of opening up passageways into the formation along which the acid can travel to more remote areas from the well bore. The salt formed upon neutralization of the acid is extensively water soluble and is readily removed by reverse flow from the formation via the well bore.

There are, however, troublesome complications attending the use of hydrochloric acid or other similar nonoxidizing mineral acids. In the acidizing process, the following primary beneficial reaction occurs: $CaCO_3 + 2HCl \rightarrow CaCl_2 + H_2O + CO_2$. Under the higher pressures required to conduct an acidization, the $CO_2$ is dissolved in the reaction mixture consisting of spent acid and connate water: $CO_2 + H_2O \leftrightarrow H_2CO_3 \leftrightarrow H^+ + HCO_3^- \leftrightarrow 2H^+ + CO_3^=$. The equilibria may be summarized and written:

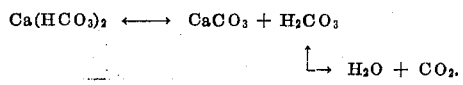

After acidization is completed, the well is often backflowed in the case of a water injection well (in order to clean out formation and tubing) and put back on production in the case of a producing oil or gas well. In both cases, pressure diminishes, $CO_2$ breaks out of solution, inducing $CaCO_3$ to precipitate. Such precipitation, when it occurs within the capillaries of a tight formation or on the tubing or annulus as mineral scale, can severely lessen production or injection rate by plugging such capillaries or well equipment.

It is known that molecularly dehydrated polyphosphates are effective in retarding $CaCO_3$ precipitation. These polyphosphates are unsatisfactory in the method of the present invention because they undergo rapid hydrolysis in the presence of the mineral acid component required in the method of the present invention. As a result, the scale inhibiting properties of these polyphosphates are destroyed. In addition, one hydrolytic reaction product, the phosphate ion ($PO_4^{-3}$), can precipitate with calcium $^{+2}$ or barium $^{+2}$ ions present in the produced water, causing additional plugging or scale deposition, further aggravating the problem. The so-called "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of mineral salts. Many of these polymeric materials are unstable in mineral acids. In such acidic media they undergo spontaneous depolymerization to an ineffective species. A representative polymeric material which undergoes such hydrolysis in the presence of acids is polyacrylamide. In addition, this polymer has a further disadvantage in that it is unstable in aqueous media at temperatures of about 300°F. and upwards. Many wells that are being treated by the method of the present invention have bottom hole temperatures of 250°–300°F. or higher.

The chemically altered natural polymers and natural polymers themselves, are effective inhibitors to prevent the precipitation of mineral salts. However, some materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface active and do not absorb on the formation face.

It is therefore, the principal object of the present invention to overcome the defects of the prior arts in acidizing fluid bearing formations such as hydrocarbon-bearing formations, etc., by providing a method of acidization employing the novel composition of this invention.

SUMMARY OF THE INVENTION

This invention encompasses and includes a method of increasing the production of fluids from a subterranean fluid-bearing formation having present acid-soluble components comprising injecting down the well bore to said formation and therefrom into said formation under a pressure greater than the formation pressure an aqueous acidizing composition hereinafter more fully described, maintaining said composition in contact with the formation strata for a time sufficient for the acid to chemically react with the acid-soluble components of the formation and/or acid-soluble mineral scale deposited on production equipment to etch or enlarge passageways through the strata and remove the scale and thereby increasing substantially the flow capacity of the said subterranean formation.

The novel aqueous acidizing composition of this invention comprises an aqueous solution of a non-oxidizing mineral acid, such as hydrochloric or sulfuric acid, having dissolved therein an admixture hereinafter described. The concentration of acid present in the subject composition is such that it is capable of reacting with the acid-soluble components of the fluid-bearing strata.

DETAILED DESCRIPTION OF THE INVENTION

In its broadest embodiment the method of the present invention comprises introducing into a subsurface formation containing acid-soluble components an aqueous acid solution of an admixture hereinafter described, wherein the said solution is maintained in contact with the formation for a time sufficient to chemically react with the formation and/or acid-soluble mineral scale deposited on production equipment so as to increase substantially the flow capabilities of the formation and to release carbon dioxide concomitantly whereby a beneficial effect due to the mutual miscibility of carbon dioxide in the fluid phases is realized as a reduction in viscosity and retentive capillary forces, while another beneficial effect is realized in the form of increased formation energy, due to the pressure generated by the released carbon dioxide.

An advantage resulting from the employment of the method of this invention in acidizing fluid-bearing formations is that the post-precipitation of dissolved carbonates is prevented or materially decreased. Such post-precipitation occurs because of the nature of the dissolution reaction:

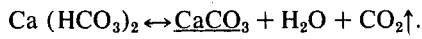

$$Ca(HCO_3)_2 \leftrightarrow CaCO_3 + H_2O + CO_2 \uparrow.$$

When pressure is released so that spent reaction products from the acidization process can be removed, carbon dioxide gas can break out of solution, causing post-precipitation of calcium carbonate. Such post-precipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The admixture useful in preparing the aqueous acidic solution of the present invention is formed from about one part by weight of a sulfated/sulfonated polyethoxy alkyl phenol containing from about 8 to about 14 carbon atoms in the alkyl group and from about 4 to about 10 ethoxyl groups, together with from about 1 to 3 parts by weight of a $C_8$–$C_{14}$ alkyl benzene sulfonic acid, including the alkali metal and ammonium salts of one or both compounds, as well as mixtures thereof.

Representative sulfated/sulfonated polyethoxy alkyl phenols include the octyl-, nonyl-, decyl-, undecyl-, dodecyl-, tridecyl-, and tetradecyl-, phenols ethoxylated with about 4 to about 10 ethoxy groups, such as the tetraethoxy-, hexaethoxy-, octaethoxy-, and decaethoxy adducts of the above nonyl phenols, the ammonium, sodium and potassium salts thereof. Particularly preferred compounds are sulfated/sulfonated tetraethoxylated nonyl phenol, sulfated/sulfonated hexaethoxylated nonyl phenol, and sulfated/sulfonated nonyl phenol containing an average of about 9.5 ethoxy groups therein.

Representative alkyl benzene sulfonic acids, including the straight and branched chain alkyl groups, useful in the practice of the invention include the octyl-, nonyl-, decyl-, undecyl-, dodecyl-, tridecyl-, and tetradecyl-, benzene sulfonic acids, the corresponding sodium potassium and ammonium salts thereof as well as mixtures of one or more of said compounds. A preferred group is the $C_{10}$–$C_{14}$ alkyl benzene sulfonic acids and the above salts thereof.

As used in the present specification and claims, the expression "sulfated/sulfonated polyethoxy alkyl phenol" refers to the reaction product of a polyethoxy alkyl phenol described hereinabove with chlorosulfonic acid or sulfur trioxide for a time period of from about 5 to 90 minutes at a temperature in the range of from about 50° to 60° C., using a reactant mole ratio of from about one mole of said phenol per 0.8 to 1.3 mole of said chlorosulfonic acid or sulfur trioxide.

Analyses of the resulting reaction products showed that from about 70 to 90 percent therof was sulfated while the 10 to 30 percent remaining was sulfonated. Accordingly, the term sulfated/sulfonated was used to describe this reaction product.

A preferred set of reaction conditions are from about 55° to about 60° C., 30 to 90 minutes in time, and mole ratios of from about one mole of said phenol per 1–1.3 mole of the chlorosulfonic acid or sulfur trioxide.

A preferred ratio of the admixture components is about one part by weight of the sulfated/sulfonated polyethoxy alkyl phenol to from about 1.25 to 2.75 parts by weight of the $C_8$–$C_{14}$ alkyl benzene sulfonic acid.

Preferably the aqueous acid composition of this invention is one comprising an aqueous solution which may include brine and from about 0.5 to about 15 percent, preferably 1 to 6 percent by weight of a non-oxidizing mineral acid, such as hydrochloric acid and which contains therewith between from about 0.005 to about 1 percent, preferably from about 0.05 to about 0.5 percent by weight of the aforesaid admixture.

Generally, the aqueous acidic solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described by Grebe et al in U.S. Pat. No. 1,877,504 or a rosin amine type as described in U.S. Pat. No. 2,758,970. The amount of the inhibitor utilized is not highly critical and it may be varied widely. Usually this amount is defined as a small but effective amount, e.g., from 0.02 percent to about 2.0 percent by weight.

In carrying out the method of this invention, a solution containing the desired amount of the non-oxidizing mineral acid dissolved in water is first prepared. An inhibitor to prevent corrosion of acid on the metal equipment associated with the well is usually added with mixing in the next step. The admixture in an amount within the stated concentration range is then admixed with the aqueous acid solution. The thus-prepared acid solution is forced, usually via a suitable pumping system, down the well bore and into contact with the production equipment and formation to be treated. As those skilled in the art will readily understand, the pressure employed is determined by the nature of the formation viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution. Generally, it is advisable to allow the aqueous acid solution to remain in contact with the formation and production equipment until the acid therein has been substantially depleted by reaction with the acid-soluble components of the formation and the deposited scale. After this, the substantially spent treating solution is reversed out of the well, i.e., it is allowed to flow back out or to be pumped out of the formation. Further, as those skilled in the art will understand, the concentrations of the admixture and acid component should be chosen to provide an acidizing fluid of the desired rheological properties.

In the method of this invention, the admixture component of the composition provides means whereby calcium ions have tendencies to precipitate as $CaCO_3$ from a super-saturated solution of $CaCO_3$ or $Ca(HCO_3)_2$ that is produced by the reaction of acid component with the formation, or previously deposited acid-soluble mineral scale combine with the admixture moiety to form a highly stable complex therein so that solid calcium carbonate does not precipitate from the spent treating solution. This binding up of the aforementioned calcium ions from weakly ionizable compounds permits the formed complex to remain dissolved in the treating solution and pass through formation pores and production equipment. nt.

Further, the admixture component of the aqueous acidic solution of the invention provides means whereby the nucleation and growth of the solid itself is thwarted, so that solid calcium carbonate does not precipitate from the spent treating solution.

Finally, the admixture provides means whereby continuous protection against post-precipitation of $CaCO_3$ is obtained for a considerable period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate to occur from such treating solution with the likelihood of plugging the formation passageways and production equipment during subsequent recovery of desirable formation hydrocarbons therethrough.

Following is a description by way of example of the method of the invention.

The use of acid concentrations above about 15 percent is unsatisfactory since such high concentrations result in hydrolysis of the sulfated/sulfonated ethoxy alkyl phenol component of the mixture.

If desired, one can also add to the aqueous acidic solution containing the admixture a polymeric material to retard the acid components tending to attack the calcereous components of the formation. Suitably, a polyvinylpyrrolidone, as more particularly described in U.S. Pat. No. 3,749,169, issued July 31, 1973, is particularly desirable and the disclosure of said patent is herein incorporated by reference.

EXAMPLE I

A producing well in East Texas can be treated in the following manner.

A treating mixture is prepared by mixing 10 barrels of salt water containing about 2,6 percent sodium chloride and 12 barrels of 3 percent by weight aqueous hydrochloric acid. There is added thereto 0.5 barrel of an admixture consisting of sulfated/sulfonated tetraethoxy nonyl phenol and ammonium dodecyl benzene sulfonate, each being present in a 1/1 ratio.

The treating mixture is squeezed into the formation at a rate of about 1/2 BPM at 450 psig. The shut-in tubing pressure is 450 psig which is bled down to zero in a short time. The well can then be returned to production.

EXAMPLE II

A treating mixture is prepared from 10 barrels of salt water (2,6 percent sodium chloride) and 12 barrels of 1 percent by weight aqueous hydrochloric acid solution containing 0.25 barrel of the same admixture. The aqueous acidic solution is injected into the producing formation in the manner approximating that used in Example I. Thereafter 20 barrels of water are used to overflush the treated formation by injection down the tubing, followed by injection of 10 barrels of water down the casing. The well is then able to be returned to production.

EXAMPLE III

The aqueous acidic solution of Example II is injected into another producing formation. An overflush of 10 barrels of water is used to force the aqueous acidic solution into the formation by injection down the tubing. The well is able to be returned to production.

It is significant that the admixture is an effective material in the presence of high calcium ion concentrations of the order of up to 10,000 ppm or more. The sulfated/sulfonated polyethoxy alkyl phenols are relatively ineffective and the alkyl benzene sulfonic acids alone are not satisfactory at calcium ion concentrations above about 50 ppm. The admixture appears to stabilize the alkyl benzene sulfonic acid component.

Obviously, many modifications and variations of the invention as hereinabove set forth may be made without departing from the spirit and scope thereof, and therefore only such limitations should be imposed as are indicated in the appended claims.

We claim:

1. A method of increasing the production of fluids from a subterranean fluid-bearing formation having present therein acid-soluble components comprising injecting down the well bore penetrating said formation and injecting therefrom into said formation under a pressure greater than the formation pressure, an aqueous acidic solution containing from about 0.5 to about 15 percent by weight of a mineral acid having an admixture therein in an amount of from about 0.0005 to about 1 percent by weight, said admixture being formed from about one part by weight of (A) a member selected from the group consisting of a sulfated/sulfonated polyethoxy alkyl phenol containing from about 8 to about 14 carbon atoms in the alkyl group and from about 4 to about 10 ethoxy groups, the corresponding alkali metal and ammonium salts and mixtures thereof, with (B) from about 1 to about 3 parts by weight of a member selected from the group consisting of a $C_8$–$C_{14}$ alkyl benzene sulfonic acid, the corresponding alkali metal and ammonium salts and mixtures thereof, maintaining said solution in contact with the formation and production equipment for a time sufficient for the acid to chemically react with the acid-soluble components of the formation to etch passageways therethrough thereby increasing substantially the flow capacity of the said subterranean formation.

2. Method as claimed in claim 1 wherein said admixture is present in said aqueous acidic solution in an amount of from about 0.05 to about 0.5 percent by weight.

3. Method as claimed in claim 1 wherein said admixture is formed from about one part by weight of said sulfated/sulfonated polyethoxy alky phenol to from about 1.2 to 2.75 parts by weight of said $C_8$–$C_{14}$ alkyl benzene sulfonic acid.

4. Mehtod as claimed in claim 1 wherein said admixture is composed of sulfated/sulfonated tetraethoxy nonyl phenol and ammonium dodecyl benzene sulfonate.

5. Method as claimed in claim 1 wherein said admixture is composed of sulfated/sulfonated hexaethoxy nonyl phenol and sodium decyl benzene sulfonate.

6. Method as claimed in claim 1 wherein said admixture is composed of sulfated/sulfonated octaethoxy nonyl phenol and ammonium dodecyl benzene sulfonate.

7. Method as claimed in claim 1 wherein said admixture is composed of sulfated/sulfonated polyethoxy nonyl phenol wherein the average number of ethoxy groups therein is about 9.5 and sodium decyl benzene sulfonate.

8. Method as claimed in claim 1 wherein said acid is present in the solution in an amount of from about 1 to about 6 percent by weight.

9. Method as claimed in claim 1 wherein said acid is hydrochloric acid.

10. Method as claimed in claim 1 wherein said acid is sulfuric acid.

11. Method as claimed in claim 1 wherein the said admixture is present in an amount of about 0.05 to about 0.5 percent by weight.

12. Method as claimed in claim 1 wherein the said formation is a hydrocarbon-bearing formation.

13. Method as claimed in claim 1 wherein the said aqueous acidic solution is injected down the bore penetrating bore penetrating said formation under a pressure greater than the formation pressure and sufficient to create fractures in the formation.

14. Method as claimed in claim 1 wherein the said aqueous acidic solution is injected down the well borepenetrating said formation under a pressure greater than the formation pressure but less than the pressure required to create fractures in the formation.

* * * * *

UNITED STATES PATENT OFFICE
CERTIFICATE OF CORRECTION

PATENT NO. : 3,860,071
DATED : April 15, 1975
INVENTOR(S) : JACK F. TATE and JIM MADDOX, Jr.

It is certified that error appears in the above-identified patent and that said Letters Patent are hereby corrected as shown below:

Col. 2, Line 54 "arts" should be --art--

Col. 3, Line 61 "ethoxyl" should be --ethoxy--

Col. 6, Line 14 "2,6" should be --2.6--

Col. 6, Line 28 "2,6" should be --2.6--

Col. 8, Claim 13, Line 2, before "bore" insert --well--

Col. 8, Claim 13, Line 3, delete "bore penetrating"

Col. 8, Claim 14, Line 3, "borepenetrating" should be --bore penetrating--

Signed and sealed this 10th day of June 1975.

(SEAL)
Attest:

RUTH C. MASON
Attesting Officer

C. MARSHALL DANN
Commissioner of Patents
and Trademarks